United States Patent
Nakashima et al.

(10) Patent No.: US 9,203,247 B2
(45) Date of Patent: Dec. 1, 2015

(54) POWER STORAGE UNIT, CORRECTION METHOD FOR CAPACITY VALUES OF STORAGE BATTERIES, AND POWER STORAGE SYSTEM

(75) Inventors: Takeshi Nakashima, Moriguchi (JP); Hayato Ikebe, Moriguchi (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 485 days.

(21) Appl. No.: 13/637,449

(22) PCT Filed: Mar. 29, 2011

(86) PCT No.: PCT/JP2011/057725
§ 371 (c)(1),
(2), (4) Date: Sep. 26, 2012

(87) PCT Pub. No.: WO2011/122592
PCT Pub. Date: Oct. 6, 2011

(65) Prior Publication Data
US 2013/0015819 A1 Jan. 17, 2013

(30) Foreign Application Priority Data

Mar. 30, 2010 (JP) ................................ 2010-078469

(51) Int. Cl.
| | |
|---|---|
| *H02J 7/00* | (2006.01) |
| *H02J 3/32* | (2006.01) |
| *H02J 7/35* | (2006.01) |
| *H01M 10/0525* | (2010.01) |
| *H01M 10/42* | (2006.01) |

(52) U.S. Cl.
CPC .......... *H02J 7/0019* (2013.01); *H01M 10/0525* (2013.01); *H01M 2010/4271* (2013.01); *H02J 3/32* (2013.01); *H02J 7/35* (2013.01); *Y02E 10/766* (2013.01)

(58) Field of Classification Search
CPC ........................................................ H02J 7/00
USPC ......................................................... 320/126
See application file for complete search history.

(56) References Cited

U.S. PATENT DOCUMENTS

| | | | | |
|---|---|---|---|---|
| 2009/0102422 | A1* | 4/2009 | Naganuma et al. | 320/118 |
| 2010/0237828 | A1* | 9/2010 | Maegawa | 320/118 |
| 2011/0279088 | A1* | 11/2011 | Yamamoto et al. | 320/134 |
| 2012/0056594 | A1* | 3/2012 | Yanagihara et al. | 320/134 |
| 2012/0249071 | A1* | 10/2012 | Yang | 320/110 |

FOREIGN PATENT DOCUMENTS

| | | |
|---|---|---|
| JP | 2002-168933 | 6/2002 |
| JP | 2008-271759 A | 11/2008 |
| WO | 9504937 A | 2/1995 |

* cited by examiner

*Primary Examiner* — Mohammed Alam
(74) *Attorney, Agent, or Firm* — Cantor Colburn LLP

(57) ABSTRACT

A power storage unit is provided which is able to facilitate recalibration and which is able to supply power even while recalibration is being performed. A method for correcting the capacity values of storage batteries, and a power storage system are also provided. In the power storage unit, a control unit turns ON a portion of the switches to connect a portion of the storage batteries to the charge and discharge path for correction, and corrects the capacity value of the portion of storage batteries by charging and discharging the portion while the other switches are turned OFF to disconnect the other storage batteries from the charge and discharge path.

7 Claims, 9 Drawing Sheets

1st Embodiment

2nd Embodiment

POWER STORAGE UNIT, CORRECTION METHOD FOR CAPACITY VALUES OF STORAGE BATTERIES, AND POWER STORAGE SYSTEM

FIELD OF THE INVENTION

The present invention relates to a power storage unit, a correction method for the capacity values of storage batteries, and a power storage system. The present invention relates more specifically to a power storage unit including a plurality of storage batteries, a correction method for the capacity values of storage batteries, and a power storage system.

BACKGROUND

Systems that use storage batteries have been put into practical use in order to effectively utilize renewable energy and nighttime power. These storage batteries are typically nickel hydrogen storage batteries or lithium-ion storage batteries, which have excellent properties such as charge and discharge efficiency. However, as in the case of lead storage batteries, it can be difficult to manage the remaining power in these storage batteries using voltage. Therefore, nickel-hydrogen and lithium-ion storage batteries have been developed with power-level gauges, and these power-level gauges are used to manage the remaining power in storage batteries and deterioration of the storage batteries. However, errors are known to occur in power-level gauges, so a means has been proposed to periodically correct errors that have occurred in these gauges (recalibration). A means for correcting errors that have occurred in power-level gauges has been disclosed in Japanese Laid-open Patent Publication No. 2008-271759 (A).

In the method disclosed in Japanese Laid-open Patent Publication No. 2008-271759 (A), a rechargeable battery is forcibly discharged, the capacity (lower capacity) of the rechargeable battery is corrected after the discharge, the rechargeable battery is charged, and the capacity (upper capacity) of the rechargeable battery is corrected after the charge to complete the recalibration.

Also, the power storage systems for storing power for renewable energy and nighttime power often include a plurality of storage batteries in order to be able to store a larger amount of power than is consumed by the expected load. This enables the power storage system to operate when there is insufficient daylight or when a power outage occurs. It also extends the life of the storage batteries because the depth of discharge is not very high.

PRIOR ART REFERENCES

Patent Document 1: Published Unexamined Patent Application No. 2008-271759 (A)

SUMMARY

However, when the recalibration method disclosed in Japanese Laid-open Patent Publication No. 2008-271759 (A) is used on a large-capacity storage battery group including a plurality of storage batteries, the storage batteries have to be completely discharged, and this requires a considerable amount of time because the overall capacity of the plurality of storage batteries is substantial. In a system including a large-capacity storage battery group having a greater capacity than the amount of power consumed by the load, such as a street light which must store enough power for the load to consume over several days to ensure against periods of insufficient daylight, the storage batteries cannot be completely discharged when power is being consumed such as overnight. As a result, a storage battery group has to be completely discharged over an extended period of time. Because charging, for example, with renewable energy has to be performed during this time, recalibration is difficult to perform. In the recalibration method disclosed in Japanese Laid-open Patent Publication No. 2008-271759 (A), the power battery group has to be completely discharged during recalibration. Therefore, power cannot be supplied from the storage battery group when the storage battery group has been completely discharged.

A purpose of the present invention is to solve this problem by providing a power storage unit, correction method for the capacity values of storage batteries, and a power storage system which are able to facilitate recalibration and which are able to supply power even while recalibration is being performed.

In order to achieve this purpose, the first aspect of the present invention is a power storage unit including a plurality of storage batteries connected in parallel via a charge and discharge path and a plurality of switches, and a control unit for ON/OFF control of the plurality of switches. In this power storage unit, the control unit turns ON a portion of the plurality of switches to connect a portion of the plurality of storage batteries to the charge and discharge path for correction, and corrects the capacity values of the portion of the plurality of storage batteries by charging and discharging the portion while the other switches are turned OFF to disconnect the other storage batteries from the charge and discharge path.

The second aspect of the present invention is a method for correcting the capacity values of a plurality of storage batteries connected in parallel via a charge and discharge path and a plurality of switches. This method includes a step for controlling the plurality of switches to connect at least a portion of the plurality of storage batteries to the charge and discharge path for correction, and to disconnect the other storage batteries from the charge and discharge path, a step for almost completely discharging the storage batteries of the portion to correct the lower limit of the capacity of the storage batteries of the portion, and a step for almost completely charging the storage batteries of the portion to correct the upper limit of the capacity of the storage batteries of the portion.

The third aspect of the present invention is a power storage system provided with a power storage unit that includes: a charge and discharge path connected to a power system, an electric generator generating power using renewable energy, and a load; a plurality of storage batteries connected in parallel via the charge and discharge path and a plurality of switches; and a control unit for ON/OFF control of the plurality of switches to control the charging and discharging of the plurality of storage batteries. In this power storage system, the control unit of the power storage unit turns ON a portion of the plurality of switches to connect a portion of the plurality of storage batteries to the charge and discharge path for correction, and, after turning OFF the other switches to disconnect the other storage batteries from the charge and discharge path, and discharging power from the portion of storage batteries to the load, corrects the capacity values of the portion of storage batteries by charging the portion of storage batteries using either the power system or the electric generator.

In the present invention, as mentioned above, a portion of the plurality of storage batteries is connected to the charge and discharge path for correction, and the capacity values of the portion of storage batteries being corrected are corrected by charging and discharging the portion of storage batteries while the other storage batteries that are not being corrected are disconnected from the charge and discharge path. In this way, the time required to charge and discharge the storage batteries is shorter than the time required to correct capacity values by completely charging and discharging a plurality of storage batteries. As a result, the capacity values of a portion of the storage batteries can be corrected relatively easily, even during situations in which long-term discharge is not possible such as during a power outage. By discharging the portion of storage batteries that are being corrected in order to correct the capacity values in this portion of storage batteries, power can be retained in the storage batteries that are not being corrected. As a result, power can be supplied from the other storage batteries while the correction values in this portion of storage batteries are being corrected, even when the portion of storage batteries has been completely discharged. Here, a storage battery is not necessarily a single cell. It can also be a single battery pack including a plurality of cells and a power-level gauge.

DETAILED DESCRIPTION

The following is an explanation of embodiments of the present invention with reference to the drawings.

1st Embodiment

The configuration of the power storage system 1 in the first embodiment of the present invention will be explained first with reference to FIG. 1.

Figure 1:
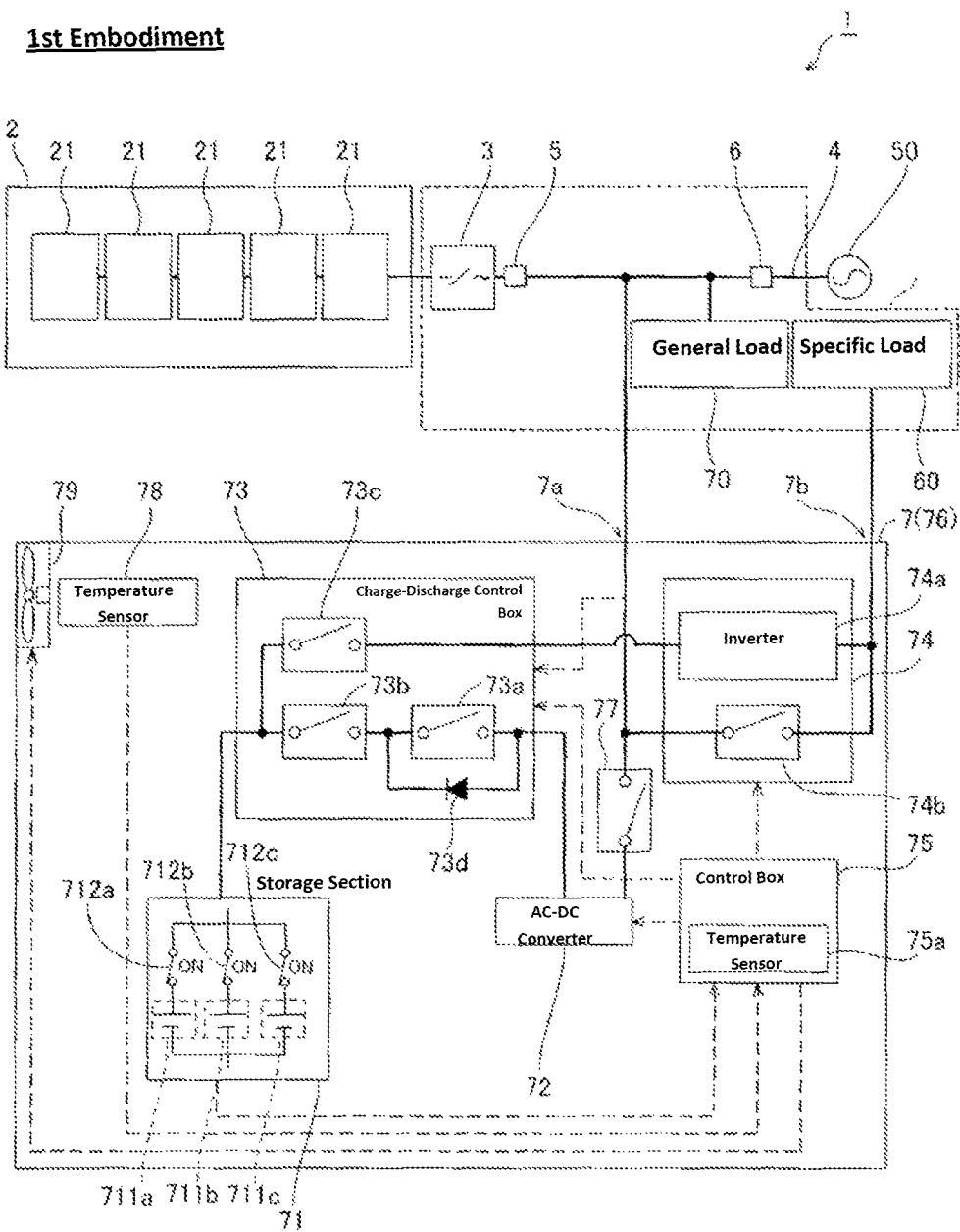
FIG. 1 is a block diagram showing the configuration of the power storage system in a first embodiment of the present invention.

As shown in FIG. 1, the power storage system 1 in the first embodiment of the present invention includes a generated-power output unit 2 for outputting power generated using sunlight, an inverter 3 connected to a power system 50 for outputting power from the generated-power output unit 2, and a bus line 4 connecting the inverter 3 and the power system 50. A power detection unit 5 for detecting the level of power outputted from the generated-power output unit 2 (power level of the photovoltaic module 21) and a power detection unit 6 for detecting power coming into and going out of the power storage system 1 (power bought and sold) are provided on the bus line 4. A power storage unit 7 including a power storage section 71 is connected to the bus line 4 via wiring 7a, and a specific load 60 is connected to the power storage unit 7 via wiring 7b. A general load 70 is also connected to the bus line 4. The bus line 4 and wiring 7a, 7b are an example of a "charge and discharge path" of the present invention. Also, the specific load 60 is an example of a "load" of the present invention.

The inverter 3 has a function for converting the direct-current power outputted from the generated-power output unit 2 to alternating current. The power generated by the generated-power output unit 2 is supplied via the inverter 3 to the power storage unit 7, the general load 70, and the power system 50.

The specific load 60 is a device operated by an alternating-current power source. The specific load 60 can be a device that runs all of the time and needs a constant supply of power from the power source. Power is usually supplied to a specific load 60 from the power storage section 71 of the power supply unit 7. When power is not supplied from the power storage section 71, it is supplied from the bus line 4. The general load 70 is also a device operated by an alternating-current power source. Power is supplied to the general load 70 from the generated-power output unit 2 via the inverter 3. Power is also supplied from the power system 50.

In the first embodiment, the specific load 60 is a lighting fixture or a constantly operating device. Therefore, the amount of power consumed by the load is limited, and the capacity of the power storage section 71 is selected based on the amount of power consumed. For example, the capacity is at least twice the daily amount of power used by a specific load 60. This allows power to be supplied to a specific load 60 when there is no generated power from the generated-power output unit 2 on account of insufficient sunlight, or when there is a power outage. The specific load 60 can also be an electrical outlet. Here, the power storage capacity can be designed, for example, to take into account the maximum capacity of the inverter 74a.

The generated-power output unit 2 includes a plurality of photovoltaic modules 21 (five in the first embodiment) which are connected to each other electrically. The photovoltaic modules 21 are an example of a "power-generating module" of the present invention. The photovoltaic modules 21 can be composed of various types of solar cells, including thin-film, crystal, and compound semiconductor solar cells.

The following is an explanation of the configuration of the power storage unit 7.

As shown in FIG. 1, the power storage unit 7 primarily includes a power storage section 71 for storing power from the bus line 4, an AC-DC converter 72 for converting alternating-current power to direct-current power, a charge-discharge control box 73 for controlling the charging and discharging of the power storage section 71, an inverter unit 74 for supplying power to a specific load 60 from the power storage section 71, and a control box 75 for controlling devices such as the power storage section 71, the AC-DC converter 72, and the charge-discharge control box 73. These devices are housed inside a case 76, and can be handled as a single unit.

Also, the power storage unit 7 is installed outdoors. The power storage unit 7 has wiring 7a for receiving power from the bus line 4, and wiring 7b for supplying power to a specific load 60.

Also, rechargeable batteries (for example, lithium-ion storage batteries) with very little natural discharge and high charge-discharge efficiency are used as the power storage section 71.

More specifically, in the first embodiment, the power storage section 71 includes three lithium-ion storage batteries 711a-711c connected in parallel. The rate voltages of the lithium-ion storage batteries 711a-711c are substantially equal. Switches 712a, 712b and 712c are connected, respectively, to the three lithium-ion storage batteries 711a, 711b and 711c. The switches 712a-712c are turned ON to connect the lithium-ion storage batteries 711a-711c to the bus line 4 or specific load 60. ON/OFF control of the switches 712a-712c is controlled by the control box 75. Here, a lithium-ion storage battery is not necessarily a single cell. It can also be a single battery pack including a plurality of cells and a power-level gauge.

The charge-discharge control box 73 includes three switches 73a, 73b and 73c that can be switched ON and OFF by the control box 75. Switches 73a and 73b are connected in series to the charge and discharge path between the AC-DC converter 72 and the power storage section 71. A diode 73d for rectifying the current flowing from the AC-DC converter 72 to the power storage section 71 is provided in the bypass path arranged in parallel to switch 73a. Switch 73c is provided in the discharge path between the power storage section 71 and the inverter unit 74.

When the power storage section 71 is charged by the bus line 4, switch 73b is first turned ON and then switch 73a is turned ON. In this way, reverse current flow from the power storage section 71 to the AC-DC converter 72, which is caused by low output voltage after the AC-DC converter 72 starts up, can be prevented by the diode 73d.

When power is discharged from the power storage section 71 to a specific load 60 via the inverter unit 74, switch 73c is turned ON. Also, switch 73a is turned ON, followed by switch 73b. In this situation, reverse current flow from the power storage section 71 to the AC-DC converter 72 can be similarly prevented by the diode 73d. When all of the switches 73a, 73b and 73c have been turned ON, both charging and discharging of the power storage section 71 can be performed.

The inverter unit 74 includes an inverter 74a serving as a DC-AC converter for supplying DC power from the power storage section 71 to a specific load 60 operated by an AC power source, and a switch 74b that can be turned ON or OFF. Switch 74b is provided between wiring 7a and wiring 7b. Switch 74b is usually turned OFF. In the inverter unit 74, switch 74b is turned ON when power is not being supplied to the inverter 74a, preferably when power above a predetermined voltage is not being supplied to the inverter 74a.

Also, a switch 77 that can be turned ON or OFF is provided between the AC-DC converter 72 and a contact between wiring 7a and switch 74b. This switch 77 is turned ON and OFF depending on the temperature of a temperature sensor 75a provided inside the control box 75. In other words, when the temperature of the temperature sensor 75a is equal to or less than a predetermined temperature (for example, approximately 70 degrees), switch 77 is turned ON and power is supplied from the bus line 4 to the AC-DC converter 72. When the temperature of the temperature sensor 75a exceeds a predetermined temperature, switch 77 is turned OFF and the electrical connection between the bus line 4 and the AC-DC converter 72 is disconnected. ON/OFF control of the switch 77 is performed by the control box 75.

Because the power for the control box 75 is received from the wiring between the switch 77 and the AC-DC converter 72, power is cut off and operation of the control box 75 automatically stops when the switch 77 is turned OFF. When the control box 75 is stopped, output from the AC-DC converter 72 is turned OFF (the supply of power to the AC-DC controller 72 is cut off), and switches 73a and 73c are turned OFF. When switch 73c is turned OFF, the supply of power to the inverter 74a is cut off. Because the supply of power to the inverter 74a is cut off, switch 74b is turned ON as mentioned above. When switch 74b is turned ON, power from the bus line 4 can be supplied to a specific load 60 via wiring 7a, switch 74b and wiring 7b instead of via the power storage section 71. Power for the control box 75 can be received from a lithium-ion storage battery. In this situation, switches can be switched to supply operating power from a lithium-ion storage battery to the control box 75 even though power is not being supplied from the system.

A temperature sensor 78 and an exhaust fan 79 are provided inside the case 76. The exhaust fan 79 can be activated to discharge heat from inside the case 76 when the temperature detected by the temperature sensor 78 is equal to or greater than a predetermined temperature (approximately 40° C.). The temperature sensor 78 and the exhaust fan 79 are not connected to the other devices inside the case 76 (the power storage section 71, the control box 75, etc.), and are operated by power received from wiring 7a. As a result, the temperature sensor 78 and the exhaust fan 79 operate independently from the other devices inside the case 76 (the power storage section 71, the control box 75, etc.), even when switch 77 is turned OFF.

The control box 75 controls the output from the AC-DC converter 72, the switches 73a-73c of the charge-discharge control box 73, switch 74b of the inverter unit 74, and switch 77 on the basis of the power level of the power storage section 71, the detection results of the temperature sensor 75a, and the current time (whether or not it is nighttime). More specifically, the control box 75 determines on the basis of the detection result from the temperature sensor 75a that overheating has occurred when the temperature inside the case 76 is equal to or greater than a predetermined temperature (for example, the temperature inside the control box 75 is approximately 70° C.), turns ON switch 74b, and turns OFF switch 77. In this way, thermal damage to the various devices inside case 76 can be reduced. Under normal conditions (when overheating has not occurred), ON/OFF control of the charge/discharge control box 73, the AC-DC converter 72, and switches such as switch 74b of inverter unit 74 are controlled on the basis of a predetermined program.

During normal operation, for example, the control box 75 can control the switches so that the power storage section 71 is charged by the power system 50 late at night, and power is supplied night or day to a specific load 60 from the power storage section 71 when a specific load 60 needs power. When power is supplied to the power supply section 71 from the bus line 4 in order to charge the power supply section 71, the current path passes through the wiring 7a, switch 77, AC-DC converter 72, switch 73a and switch 73b. When power is discharged from the power storage section 71 in order to supply power to a specific load 60, the current path passes through switch 73c, inverter 74a, and wiring 7b. Power stored in the power storage section 71 is not supplied to the power system 50.

In the first embodiment, the control box 75 controls the switches so that power is discharged from the lithium-ion storage batteries 711a, 711b and 711c in the power storage section 71 to a specific load 60 while the lithium-ion storage batteries 711a-711c are being recalibrated. Also, the control box 75 controls the switches so that the lithium-ion storage batteries 711a-711c are charged by power supplied from the generated-power output unit 2 or the power system 50 when the lithium-ion storage batteries 711a-711c are being charged during recalibration.

The control box 75 turns the switches 712a-712c in the power storage section 71 ON or OFF to connect a portion of the lithium-ion storage batteries (for example, lithium-ion storage battery 711c) to the bus line 4 or specific load 60 for correction (recalibration), and to disconnect the rest of the lithium-ion storage batteries (for example, lithium-ion storage batteries 711a and 711b) from the bus line 4 or a specific load 60. When this has been done, the capacity value of the lithium-ion storage battery 711c being corrected is corrected by discharging and discharging the lithium-ion storage battery 711c being corrected. After the capacity value of the one lithium-ion storage battery 711c has been corrected, the control box 75 connects lithium-ion storage batteries 711a and 711b, which were disconnected from the charge and discharge path during correction, to the bus line 4 or a specific load 60, and the capacity values of lithium-ion storage batteries 711a and 711b are corrected in successive order to correct the capacity values of all three lithium-ion storage batteries 711a-711c.

Also, in the first embodiment, the control box 75 almost completely discharges the portion of lithium-ion storage batteries (for example, lithium-ion storage battery 711c) being corrected, and then corrects the lower limit of the capacity of the lithium-ion storage battery 711c. Afterwards, charging of the lithium-ion storage battery 711c is started. When the voltage of the lithium-ion storage battery 711c is substantially equal to the voltage of the other lithium-ion storage batteries (for example, lithium-ion storage batteries 711a and 711b) which are not being corrected, lithium-ion storage battery 711c is connected along with lithium-ion storage batteries 711a and 711b to the bus line 4 or a specific load 60. Afterwards, with the lithium-ion storage battery 711c being corrected and lithium-ion storage batteries 711a and 711b not being corrected connected to the bus 4, the control box 75 corrects the upper value of the capacity of the lithium-ion storage battery 711c by almost completely charging the lithium-ion storage battery 711c. Lithium-ion batteries 711a and 711b are charged at the same time. Here, completely discharging and charging a battery means discharging and charging a battery to a level set by the user, who has taken into account the characteristics of the batteries and the performance of the batteries as a system. For example, in the case of a lithium-ion storage battery with a full charge of 4.2 V as a characteristic of the battery, complete discharge of the battery can be set as an inter-terminal voltage of 3 V, and complete charge (full charge) of the battery can be set as an inter-terminal voltage of 4 V. Also, an almost complete discharge or charge means discharging or charging the battery, respectively, to the lower value or upper value of the capacity which are the correction points. For example, the correction points do not have to match the fully discharged state (3 V:SOC=0%) and the fully charged state (4 V:SOC=100%) set by the user. For example, lower value correction can be complete when the voltage corresponding to SOC=5% has been reached. Here, discharge to a voltage corresponding to SOC=5% means the battery has been almost completely discharged.

Also, the control box 75 controls the discharge of the power storage section 71 so that the capacity of the power storage section 71 does not fall below the prohibited discharge threshold value (for example, 50% of the full charge state) when the power storage section 71 is discharged under normal operating conditions. The prohibited discharge threshold value can be set to take into account the power consumption level of a specific load 60. For example, the prohibited discharge threshold value can be set so that the amount of power consumed by a specific load 60 over one day or several days is stored. The control box 75 changes the switches to stop the supply of power to a specific load 60 from the power storage section 71 and supply power to a specific load 60 directly from the bus line 4 when it has been determined that the capacity of the power discharge section 71 has fallen below the prohibited discharge threshold value.

Because the supply of power from the power system 50 stops under emergency conditions such as a power outage, the control box 75 is stopped. Switch 77 and switches 73a and 73b are also turned OFF. Because power is not supplied to the AC-DC converter 72 because of this, operation of the AC-DC converter 72 also stops. When a voltage line signal is inputted from the wiring 7a to switch 73c and a power outage occurs, the absence of voltage from the wiring 7a is detected, and switch 73c is turned ON. As a result, the inverter 74a is operated using a supply of power from the power storage section 71, and power can be supplied to a specific load 60.

The discharge is also controlled so that the power level of the power storage section 71 does not fall below the prohibited discharge threshold value (for example, 50%) during normal operation. As a result, when discharge of the power storage section 71 to a specific load 60 is initiated during an emergency situation such as a power outage, a power level greater than the prohibited discharge threshold value (50% of the full charge state) is available without fail in the power storage section 71. During a power outage, the absence of voltage in the wiring 7a is detected and switch 73c is turned ON to allow for a discharge even when the power level of the power storage section 71 is below the prohibited discharge threshold value (50% of the full charge state). In this embodiment, lithium-ion storage batteries are used as the power storage section 71. Therefore, unlike a lead battery from which a complete discharge is undesirable because of sulfation, nearly all of the stored energy can be discharged. In an emergency situation, the supply of power to the control box 75 is discontinued. During this time, switch 73c cannot be switched ON or OFF. However, stored power is available by using the lithium-ion stored batteries.

The following is an explanation of the physical configuration (arrangement of devices, etc.) in the power storage unit 7.

Figure 2:
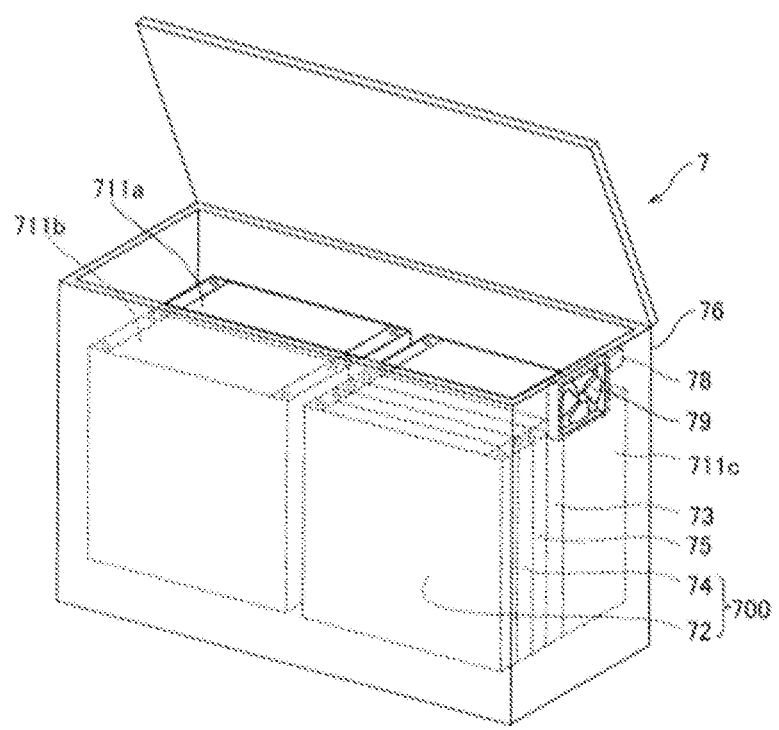
FIG. 2 is a perspective view showing a power storage unit of the power storage system in the first embodiment of the present invention.
Figure 3:
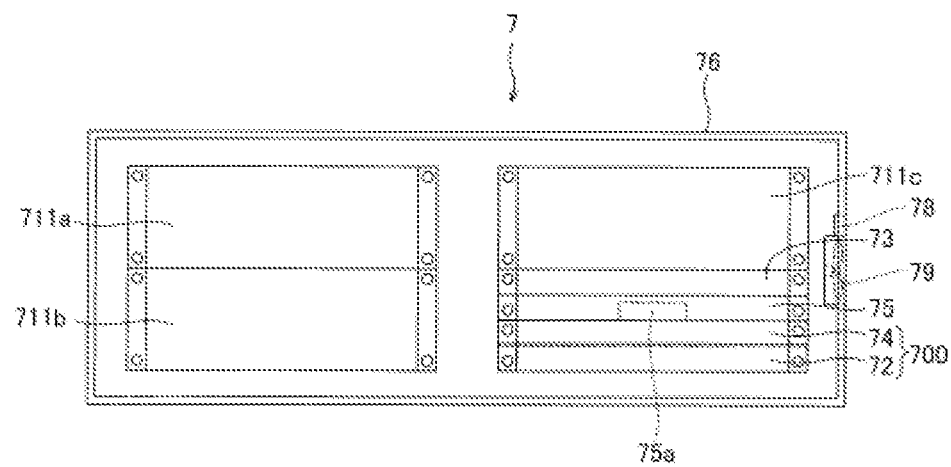
FIG. 3 is a top view showing a power storage unit of the power storage system in the first embodiment of the present invention.

As shown in FIG. 2 and FIG. 3, the power storage unit 7 contains three box-shaped lithium-ion storage batteries 711a-711c in a box-shaped case 76, a box-shaped charge-discharge control box 73, a box-shaped control box 75, and a box-shaped power conversion unit 700 having an inverter unit 74 and an AC-DC converter 72. The lithium-ion storage batteries 711a-711c can be pack-like battery units in which a plurality of lithium-ion cells are connected in series or in parallel. The power storage section 71 includes these three lithium-ion storage batteries 711a-711c. These five devices (the three lithium-ion storage batteries 711a-711c, the charge-discharge control box 73, the control box 75 and the power conversion unit 700) are arranged in parallel so as to be adjacent to each other in the lateral direction. As shown in FIG. 3, the control box 75 and the power conversion unit 700 are adjacent to each other. In the power conversion unit 700, the inverter unit 74 is arranged on the control box 75 side. In other words, the AC-DC converter 72 is arranged at a position separated from the control box 75 by the inverter unit 74. A temperature sensor 75a is arranged in the control box 75 on the inverter unit 74 side. The exhaust fan 79 is disposed on the upper side surface of the case 76, and a temperature sensor 78 is arranged at a position adjacent to the exhaust fan 79.

When the temperature inside the case 76 is greater than a predetermined temperature (approximately 40° C.), the heat accumulated inside the case 76 is discharged from the upper portion of the case 76 via the exhaust fan 79. Also, a communication unit (not shown) is provided in lithium-ion storage battery 711, the charge-discharge control box 73, and the power conversion unit 700 to allow the state of each device (for example, the temperature) to be communicated to the control box 75. The lithium-ion storage batteries 711a-711c are connected in series to each other using a daisy chain pattern, and the three lithium-ion storage batteries 711a-711c are treated as a single unit in the communication process.

The following is an explanation with reference to FIG. 4 through FIG. 8 of the operations performed by the control box 75 during recalibration of the lithium-ion storage batteries 711a-711c in the power storage unit 7 of the first embodiment. Recalibration of the lithium-ion storage batteries 711a-711c is performed, for example, every three months. During the recalibration of the lithium-ion storage batteries 711a-711c performed every three months, one lithium-ion storage battery is recalibrated each day over a series of three days.

Figure 4:
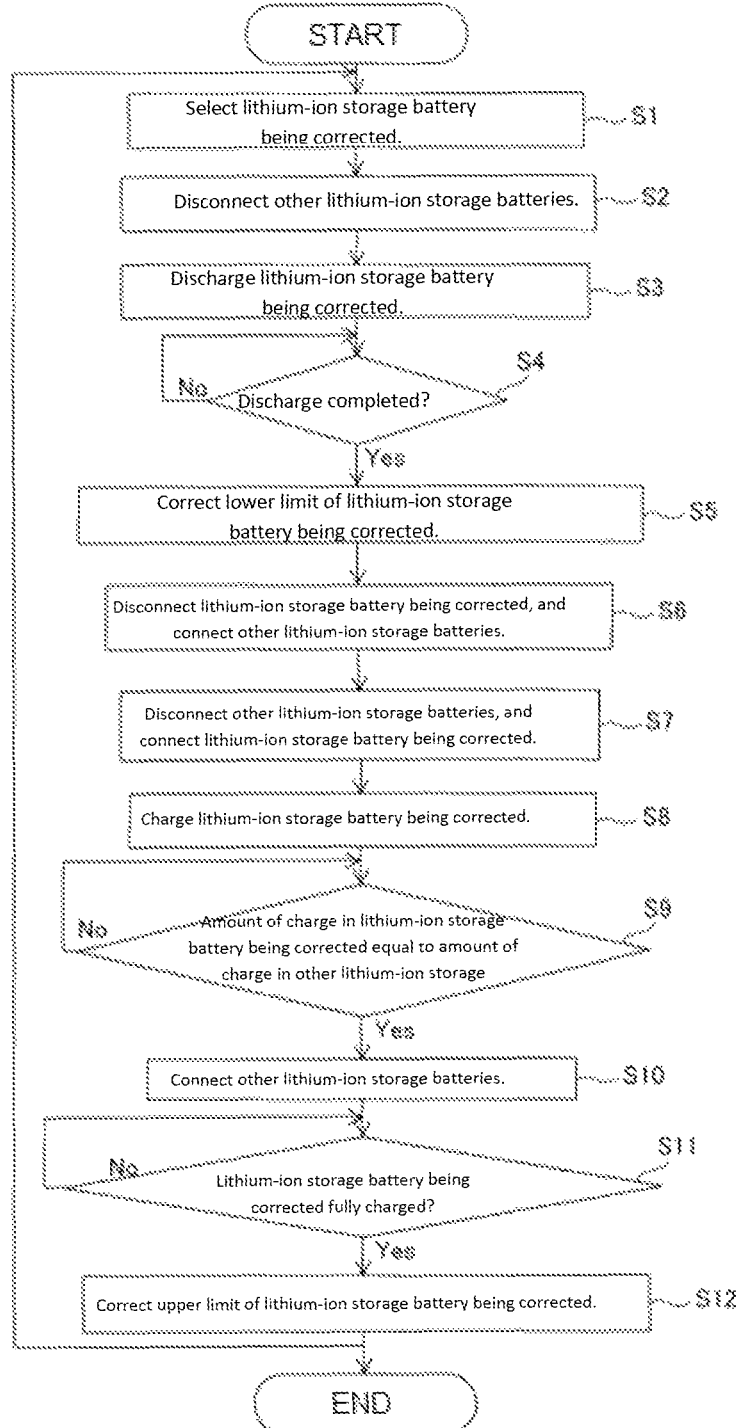
FIG. 4 is a flowchart used to explain the recalibration operation for a power storage unit in the first embodiment of the present invention.
Figure 5:
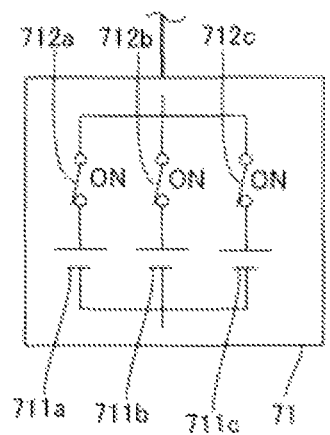
FIG. 5 is a circuit diagram of a power storage unit in the first embodiment of the present invention showing a situation in which three lithium-ion storage batteries have been connected.
Figure 6:
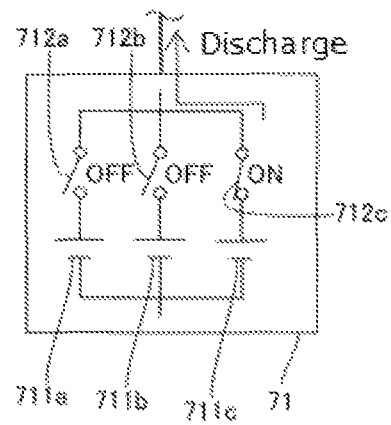
FIG. 6 is a circuit diagram of a power storage unit in the first embodiment of the present invention showing a situation in which the lithium-ion storage battery being corrected is being discharged.

First, during normal operations, as shown in FIG. 5, the switches 712a-712c are turned ON, and the lithium-ion storage batteries 711a-711c are connected to a specific load 60 (bus line 4) via the charge-discharge control box 73. When the lithium-ion storage batteries 711a-711c are calibrated, in Step S1 of FIG. 4, the lithium-ion storage battery 711a-711c to be calibrated (corrected) is selected. Here, lithium-ion storage battery 711c is selected. In other words, lithium-ion storage batteries 711a and 711b are not being corrected. Next, in Step S2, as shown in FIG. 6, switches 712a and 712b are turned OFF. Also, switch 712c remains turned ON. As a result, lithium-ion storage batteries 711a and 711b are disconnected from a specific load 60. Lithium-ion battery 711c remains connected to a specific load 60. At this time, switch 73c in the charge-discharge control box 73 is turned ON, and switches 73a and 73b are turned OFF.

Next, in Step S3, power is discharged from lithium-ion storage battery 711c. Power discharged from the lithium-ion storage battery 711c is supplied to a specific load 60. Then, in Step S4, it is determined whether or not the discharge of lithium-ion storage battery 711c has been completed (completely discharged). In order to determine whether or not discharge of the lithium-ion storage battery 711c has been completed, the voltage discharged from the lithium-ion storage battery 711c can be detected. When the detected voltage falls below a specified value (close to zero), it is determined that the discharge has been completed. The operation in Step S4 is repeated until it is determined in Step S4 that discharge of the lithium-ion storage battery 711c has been completed. Here, in the first embodiment, only one lithium-ion storage battery 711c among the three lithium-ion storage batteries 711a-711c is being discharged. As a result, the discharge takes approximately one-third of the time required to discharge all three batteries. When it has been determined in Step S4 that the discharge of lithium-ion storage battery 711c has been completed, the process proceeds to Step S5, where the current capacity value of the lithium-ion storage battery 711c is recorded as the lower limit of the capacity in the control box 75. In this way, the lower limit of the capacity of the lithium-ion storage battery 711c is corrected.

Figure 7:
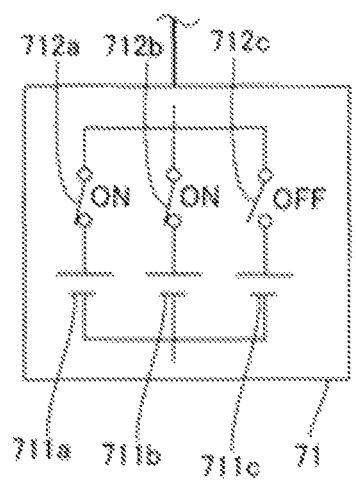
FIG. 7 is a circuit diagram of a power storage unit in the first embodiment of the present invention showing a situation in which the lithium-ion storage batteries other than the one being corrected have been connected.

Next, the process proceeds to Step S6, where, after turning OFF switch 712c, switches 712a and 712b are turned ON as shown in FIG. 7. In this way, lithium-ion storage batteries 711a and 711b are connected to a specific load 60, and lithium-ion storage battery 711c is disconnected from a specific load 60. In this state, the charge level of lithium-ion storage battery 711c is near zero, but lithium-ion storage batteries 711a and 711b are charged. Therefore, during emergency situations such as a power outage, lithium-ion storage batteries 711a and 711b can supply power to a specific load 60 if switch 712c is turned OFF, and switches 712a and 712b are turned ON.

Figure 8:
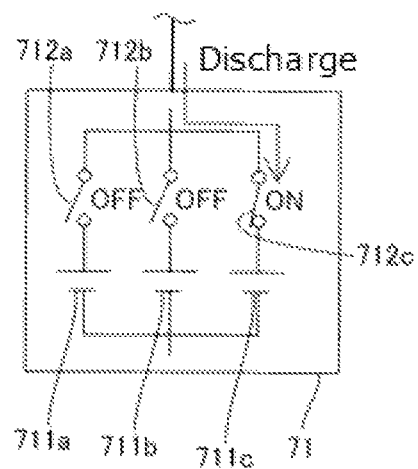
FIG. 8 is a circuit diagram of a power storage unit in the first embodiment of the present invention showing a situation in which the lithium-ion storage battery being corrected is being charged.

Next, the process proceeds to Step S7, where, after turning OFF switches 712a and 712b, switch 712c is turned ON as shown in FIG. 8. In this way, lithium-ion storage batteries 711a and 711b are disconnected from the bus line 4, and lithium-ion storage battery 711c is connected to the bus line 4. At this time, in the charge-discharge control box 73, switch 73c is turned OFF, and switches 73a and 73b are turned ON. Next, the process proceeds to Step S8, where lithium-ion storage battery 711c is charged by generated-power output unit 2 or power system 50. If it is daytime, lithium-ion storage battery 711c is charged by the generated-power output unit 2 or the power system 50. If it is nighttime, it is charged by the power system 50. Step S6 through Step S7 are required when power has to be supplied to a specific load 60 after discharge of lithium-ion storage battery 711c. When power does not have to be supplied to a specific load 60 while lithium-ion storage battery 711c is being discharged and re-charged, these steps can be omitted.

Next, in Step S9, it is determined whether or not the voltage of lithium-ion storage battery 711c is equal to the voltage of lithium-ion storage batteries 711a and 711b. The operation in Step S9 is repeated while the voltage of lithium-ion storage battery 711c is lower than the voltage of lithium-ion storage batteries 711a and 711b. When it has been determined that the voltage of lithium-ion storage battery 711c is equal to the voltage of lithium-ion storage batteries 711a and 711b, the process proceeds to Step S10, where switch 712c is turned ON along with switches 712a and 712b (see FIG. 5). In this way, lithium-ion storage battery 711c is connected to the bus line 4 along with lithium-ion storage batteries 711a and 711b.

Afterwards, normal operation occurs with lithium-ion storage batteries 711a-711c connected to the bus line 4 or a specific load 60. During normal operation, it is determined in Step S11 whether or not lithium-ion storage battery 711c is fully charged (almost fully charged). When it has been determined that lithium-ion storage battery 711c is fully charged, the process proceeds to Step S12, where the current capacity value of lithium-ion storage battery 711c is recorded in the control box 75 as the upper limit of the capacity. In this way, the upper limit of the capacity of the lithium-ion storage battery 711c is corrected. Recalibration of lithium-ion storage battery 711c is then complete.

After recalibration of lithium-ion storage battery 711c has been completed, the operations in Steps S1-S12 are performed successively on lithium-ion storage battery 711a and lithium-ion storage battery 711b in order to recalibrate uncorrected lithium-ion storage batteries 711a and 711b. In this way, all of the lithium-ion storage batteries 711a-711c are recalibrated.

In the first embodiment, as mentioned above, the portion of the three lithium-ion storage batteries 711a-711c (for example, lithium-ion storage battery 711c) being corrected was connected to the bus line 4 or a specific load 60, and the other lithium-ion storage batteries (for example, lithium-ion storage batteries 711a and 711b) not being corrected were disconnected from the bus line 4 or a specific load 60. By charging and discharging the lithium-ion storage battery 711*c* being corrected in this state, the capacity value of the lithium-ion storage battery 711*c* being corrected is corrected. In this way, the time required to charge and discharge (especially discharge) the lithium-ion storage battery 711*c* is shorter than the time required to correct capacity values by completely charging and discharging all three lithium-ion storage batteries 711*a*-711*c*. As a result, the capacity value of lithium-ion storage battery 711*c* can be corrected relatively easily, even in situations allowing for long-term discharge such as during a power outage. By discharging lithium-ion storage battery 711*c* being corrected in order to correct the capacity value of lithium-ion storage battery 711*c*, power can be retained in lithium-ion storage batteries 711*a* and 711*b* that are not being corrected. As a result, power can be supplied from lithium-ion storage batteries 711*a* and 711*b*, even when lithium-ion storage battery 711*c* has been completely discharged.

Also, in the first embodiment, as mentioned above, the control box 75 corrects in successive order the capacity values of the three lithium-ion storage batteries 711*a*-711*c* being corrected. This allows the time required for calibration to be reduced, even when the amount of power consumed by a specific load 60 is small.

In the first embodiment, as mentioned above, the control box 75 almost completely discharges the lithium-ion storage battery being corrected (for example, lithium-ion storage battery 711*c*), and charging of the lithium-ion storage battery 711*c* is initiated after correction of the lower limit of the capacity of the lithium-ion storage battery 711*c*. When the voltage of the lithium-ion storage battery 711*c* is almost equal to the lithium-ion storage batteries not being corrected (for example, lithium-ion storage batteries 711*a* and 711*b*), lithium-ion storage battery 711*c* is connected along with lithium-ion storage batteries 711*a* and 711*b* to a specific load 60. This can prevent short-circuiting of and damage to the lithium-ion storage batteries 711*a*-711*c* due to differences in voltage between the lithium-ion storage batteries 711*a*-711*c*.

In the first embodiment, as mentioned above, the control box 75 almost completely charges the lithium-ion storage battery being corrected (for example, lithium-ion storage battery 711*c*) to correct the upper limit of the capacity of the lithium-ion storage battery 711*c*, while the lithium-ion storage battery 711*c* is connected along with the lithium-ion storage batteries not being corrected (for example, lithium-ion storage batteries 711*a* and 711*b*) to the bus line 4. In this way, the upper limit of the capacity of the lithium-ion storage battery 711*c* can be easily corrected during normal operation in which the lithium-ion storage batteries 711*a*-711*c* are connected electrically.

In the first embodiment, as mentioned above, the lithium-ion storage battery to be charged (for example, lithium-ion storage battery 711*c*) is discharged to a specific load 60 connected to the wiring 7*b*. In this way, recalibration can be performed while operating a specific load 60.

In the first embodiment, as mentioned above, the lithium-ion storage battery to be charged (for example, lithium-ion storage battery 711*c*) is charged by the power system 50 or the generated-power output unit 2 connected to the bus line 4. In this way, charging can be easily performed using the power system 50 when the power level of the generated-power output unit 2 is low.

2nd Embodiment

The following is an explanation of a power storage system 1 in a second embodiment of the present invention. In the second embodiment, the three lithium-ion storage batteries are connected after being almost fully charged. In the first embodiment, the three lithium-ion storage batteries are connected before the lithium-ion storage battery to be corrected is almost fully charged. The rest of the power storage system is similar to the one in the first embodiment.

In the power storage system 1 of the second embodiment, the control box 75 first almost completely discharges the portion of lithium-ion storage batteries being corrected (for example, lithium-ion storage battery 711*c*), corrects the lower limit of the capacity of the lithium-ion storage battery 711*c*, almost completely charges the lithium-ion storage battery 711*c*, and corrects the capacity of the lithium-ion storage battery 711*c*. Afterwards, the control box 75 almost completely charges the rest of the lithium-ion storage batteries not being corrected (for example, lithium-ion storage batteries 711*a* and 711*b*), and connects lithium-ion storage battery 711*c* along with lithium-ion storage batteries 711*a* and 711*b* to the bus line 4.

Figure 9:
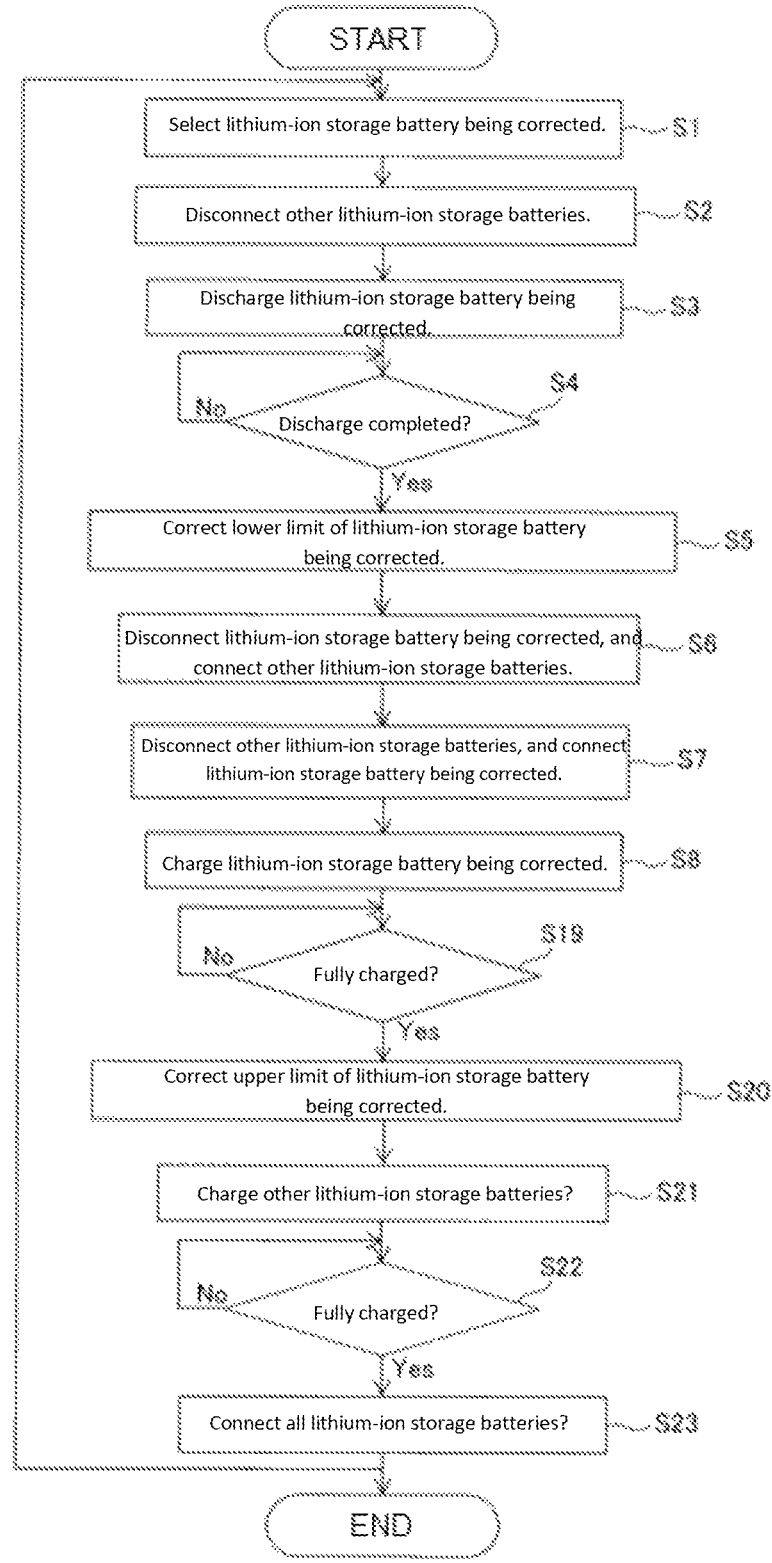
FIG. 9 is a flowchart used to explain the recalibration operation for a power storage unit in a second embodiment of the present invention.

The following is an explanation with reference to FIG. 9 of the recalibration operation performed on the lithium-ion storage batteries 711*a*-711*c* inside the power storage unit 7 in the second embodiment of the present invention.

Steps S1 through S8 of the recalibration operation performed on the lithium-ion storage batteries 711*a*-711*c* in the second embodiment are similar to those performed on the lithium-ion storage batteries 711*a*-711*c* in the first embodiment (see FIG. 4).

In the second embodiment, charging of lithium-ion storage battery 711*c* being corrected is initiated in Step S8 after discharge of the lithium-ion storage battery 711*c* has been completed. In Step S19, it is determined whether or not the lithium-ion storage battery 711*c* has been fully charged (almost fully charged). The operation in Step S19 is repeated until it has been determined in Step S19 that the lithium-ion storage battery 711*c* has been fully charged. When it has been determined in Step S19 that the lithium-ion storage battery 711*c* has been fully charged, the process proceeds to Step S20, where the capacity value of the lithium-ion storage battery 711*c* is recorded in the control box 75 as the upper limit of the capacity. When correction of the upper limit and the lower limit of the capacity of the lithium-ion storage battery 711*c* has ended, switch 712*c* is turned OFF, switches 712*a* and 712*b* are turned ON in Step S21, and lithium-ion storage batteries 711*a* and 711*b* are charged. In Step S22, it is determined whether or not lithium-ion storage batteries 711*a* and 711*b* have been fully charged. When it has been determined in Step S22 that lithium-ion storage batteries 711*a* and 711*b* have been fully charged, the process proceeds to Step S23, where switches 712*a*-712*c* in the power storage section 71 are all turned ON, and the lithium-ion storage batteries 711*a*-711*c* are connected to the bus line 4 or a specific load 60. Lithium-ion storage batteries 711*a* and 711*b* are then recalibrated one at a time in the same way as lithium-ion storage battery 711*c*.

Because the control box 75 does not have to compare the voltages of the lithium-ion storage batteries 711*a*-711*c*, the recalibration operation can be simplified in the second embodiment.

The other effects of the second embodiment are the same as those of the first embodiment.

3rd Embodiment

Figure 10:
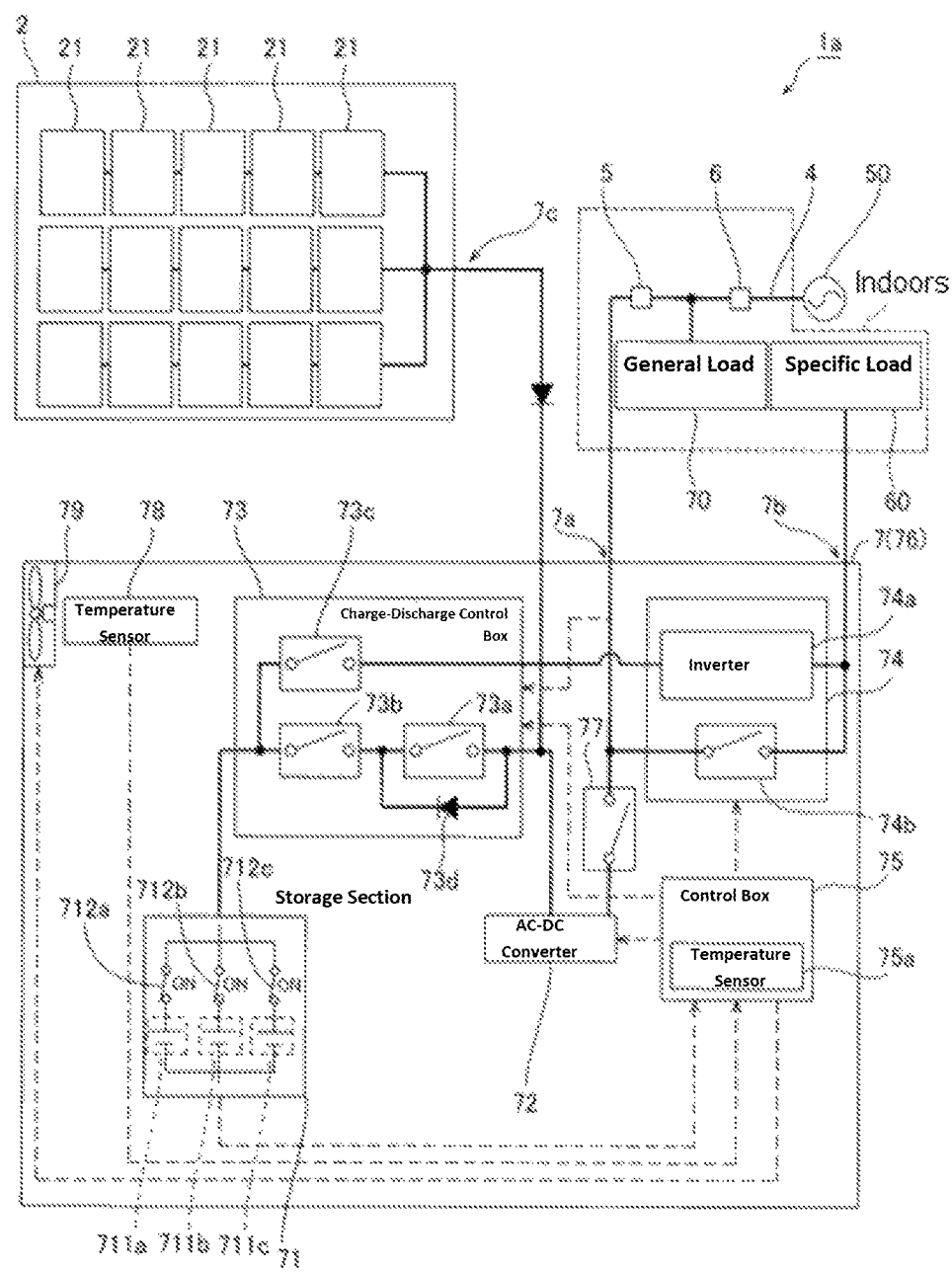
FIG. 10 is a block diagram showing the configuration of a power storage system in a third embodiment of the present invention.

The following is an explanation with reference to FIG. 10 of the power storage system 1*a* in a third embodiment of the present invention. In the third embodiment, the generated-power output unit 2 is connected directly to the power storage section 71. In the first and second embodiments, the generated-power output unit 2 was connected to the power system 50 via the bus line 4.

In the power storage system 1a in the third embodiment of the present invention, as shown in FIG. 10, the generated-power output unit 2, which outputs power generated using sunlight, is connected not to the bus line 4 connected to the power system 50 but directly to the power storage unit 7 via wiring 7c. All of the power generated by the generated-power output unit 2 is supplied to a specific load 60 after it has been stored in the power storage section 71. In other words, the power generated by the generated-power output unit 2 is not supplied directly to a general load 70. As a result, the power storage system 1a does not require an inverter 3 (see FIG. 1) to convert the direct-current output generated by the generated-power output unit 2 to alternating-current output.

Power can be supplied from the power system 50 to the power storage section 71. When the lithium-ion storage batteries 711a-711c are being recalibrated, the lithium-ion storage batteries 711a-711c are charged by power generated by the generated-power output unit 2 or by power supplied from the power system 50. The rest of the configuration and effects of the third embodiment are similar to those of the first and second embodiments.

All of the embodiments disclosed herein are for illustrative purposes only, and should not be considered limiting in any way. The scope of the present invention is indicated by the scope of the claims and not by the explanation of the embodiments, and includes all modifications with equivalent meaning to the scope of the claims.

For example, in the first through third embodiment, there were three lithium-ion storage batteries 711a-711c in the power storage section 71. However, the present invention is not limited to these embodiments. For example, there can be two lithium-ion storage batteries in the power storage section 71, or four or more lithium-ion storage batteries in the power storage section.

In the first through third embodiments, the capacities of the three lithium-ion storage batteries 711a-711c were corrected one at a time. However, the present invention is not limited to these embodiments. For example, the capacities of two lithium-ion storage batteries among the three lithium-ion storage batteries 711a-711c can be simultaneously corrected.

Figure 11:
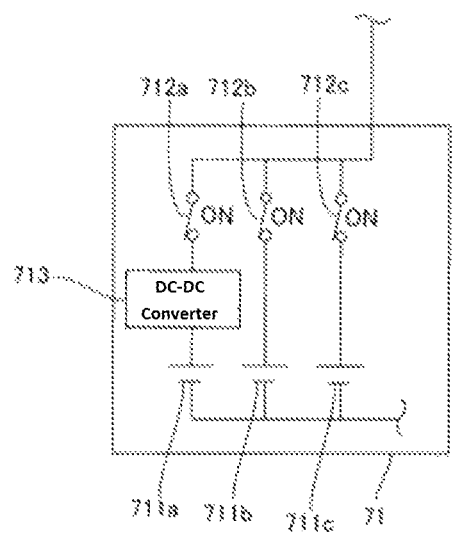
FIG. 11 is a block diagram showing the configuration of a power storage unit in a variation on the first through third embodiments of the present invention.

In the first through third embodiments, the rated voltages of the lithium-ion storage batteries 711a-711c were substantially equivalent. However, the present invention is not limited to these embodiments. For example, in the variation shown in FIG. 11, the chargeable voltage of a portion of the lithium-ion storage batteries (for example, lithium-ion storage battery 711a) differs from the chargeable voltage of lithium-ion storage batteries 711b and 711c. Here, a DC-DC converter 713 is installed between lithium-ion storage battery 711a and switch 712a, and voltage converted by the DC-DC converter 713 is rendered substantially equivalent to the voltages of lithium-ion storage batteries 711b and 711c.

In the first through third embodiments, the storage batteries can be charged by either the generated-power output unit or the power system. However, the present invention is not limited to these embodiments. For example, either the generated-power output unit or the power system can be installed alone, and the storage batteries can be charged either by the generated-power output unit or the power system alone.

In the first through third embodiments, the three lithium-ion storage batteries are recalibrated over three successive days every three months. However, the present invention is not limited to these embodiments. For example, one of the three lithium-ion storage batteries can be calibrated every month. The storage batteries can also be recalibrated on a day specified by the user.

In the first through third embodiments, power was generated by a photovoltaic module. However, the present invention is not limited to these embodiments. The power-generating module can be a direct-current power-generating device or a power-generating module that generates power using renewable energy such as a wind power generating device.

In the first through third embodiments, lithium-ion storage batteries were used in the power storage section. However, the present invention is not limited to these embodiments. Other rechargeable batteries can be used. For example, nickel-hydrogen storage batteries can be used.

In the first through third embodiments, a device operated by an alternating-current power source was the specific load 60. However, it can also be a device operated by a direct-current power source. Here, a DC-DC converter for DC-DC current voltage conversion is used between the power storage section 71 and the specific load 60 instead of an inverter 74a for DC to AC voltage conversion. Alternatively, the power storage section 71 and the specific load 60 can connected directly to each other. Also, the specific load 60 can be a mixture of direct-current loads and alternating-current loads.

In the first embodiment, the lower limit of the lithium-ion storage battery being corrected was corrected, the rest of the lithium-ion storage batteries not being corrected were connected electrically, and the upper limit of the lithium-ion storage battery being corrected was corrected. However, the present invention is not limited to this embodiment. For example, the lower limit of the lithium-ion storage battery being corrected can be corrected, the lithium-ion storage battery being corrected can be charged, and the lithium-ion storage battery being corrected and the rest of the lithium-ion storage batteries not being corrected can be connected electrically when the voltage of the lithium-ion storage battery being corrected is substantially equal to the voltage of the lithium-ion storage batteries not being corrected.

In the third embodiment, the power storage section 71 can be charged by the power system 50 and the power stored in the power storage section 71 cannot be discharged to the bus line 4. However, the present invention is not limited to this embodiment. For example, the present invention can be configured so that the power storage section 71 is not charged by the power system 50 and the power stored in the power storage section 71 can be discharged to the bus line 4.

What is claimed is:

1. A power storage unit comprising a plurality of storage batteries connected to a charge and discharge path in parallel via a charge and discharge path and a plurality of switches, and a control unit for ON/OFF control of the plurality of switches, wherein the control unit turns ON a portion of the plurality of switches to connect a portion of the plurality of storage batteries to the charge and discharge path for correction, and corrects capacity values of the portion of the plurality of storage batteries by charging and discharging the portion of the plurality of storage batteries while switches other than the portion of the plurality of switches are turned OFF to disconnect storage batteries other than the portion of the plurality of storage batteries from the charge and discharge path;

wherein the control unit, after correcting the capacity values of the portion of the plurality of storage batteries, turns OFF the portion of the plurality of switches, and turns ON at least a portion of the switches other than the portion of the plurality of switches to connect at least a portion of the other storage batteries to the charge and discharge path, and corrects the capacity values of at least the portion of the other storage batteries.

2. A power storage unit according to claim 1, wherein the electric power charged to the plurality of storage batteries is not discharged to a power system but rather is discharged to a load connected to the charge and discharge path.

3. A power storage unit according to claim 1, wherein the plurality of storage batteries is charged by either a power system connected to the charge and discharge path, or an electric generator generating power using renewable energy.

4. A method for correcting capacity values of a plurality of storage batteries connected in parallel via a charge and discharge path and a plurality of switches, the method comprising:
   controlling the plurality of switches to connect at least a portion of the plurality of storage batteries to the charge and discharge path for correction, and to disconnect storage batteries other than the portion of the plurality of storage batteries from the charge and discharge path;
   almost completely discharging the portion of the plurality of the storage batteries to correct the lower limit of the capacity of the portion of the plurality of the storage batteries; and
   almost completely charging the portion of the plurality of the storage batteries to correct the upper limit of the capacity of the portion of the plurality of the storage batteries;
   wherein the correcting the upper limit of the capacity of the portion of the plurality of the storage batteries further comprises:
      initiating the charging of the portion of the plurality of the storage batteries;
      comparing the voltage of the portion of the plurality of the storage batteries to the voltage of the storage batteries other than the portion of the plurality of storage batteries;
      controlling the plurality of switches to connect the storage batteries other than the portion of the plurality of storage batteries to the charging and discharging path when the results of the comparison are substantially equal; and
      almost completely charging both the portion of the plurality of the storage batteries and the storage batteries other than the portion of the plurality of storage batteries to correct the upper limit of the capacity of the portion of the plurality of the storage batteries.

5. A method for correcting the capacity values of a plurality of storage batteries according to claim 4, further comprising the steps of: controlling the plurality of switches to disconnect the portion of storage batteries from the charge and discharge path, and to connect the other storage batteries to the charge and discharge path; charging the other storage batteries, and determining whether or not the other storage batteries have been fully charged; and controlling the plurality of switches to connect the portion of storage batteries to the charge and discharge path when the results of the determination are that the other storage batteries have been fully charged.

6. A power storage system comprising a power storage unit including a charge and discharge path connected to a power system, an electric generator generating power using renewable energy, and a load, a plurality of storage batteries connected in parallel via the charge and discharge path and a plurality of switches, and a control unit for ON/OFF control of the plurality of switches to control the charging and discharging of the plurality of storage batteries, wherein the control unit of the power storage unit turns ON a portion of the plurality of switches to connect a portion of the plurality of storage batteries to the charge and discharge path for correction, and, after turning OFF the other switches to disconnect the other storage batteries from the charge and discharge path, and discharging power from the portion of storage batteries to the load, corrects capacity values of the portion of the plurality of the storage batteries by charging the portion of the plurality of the storage batteries using either the power system or the electric generator;
   wherein the control unit, after correcting the capacity values of the portion of the plurality of the storage batteries, turns OFF the portion of the plurality of the switches, and turns ON at least a portion of switches other than the portion of the plurality of the switches to connect at least a second portion of the plurality of the storage batteries other than the portion of the storage batteries to the charge and discharge path, and corrects the capacity values of at least the second portion of the plurality of the storage batteries.

7. The power storage system of claim 6, wherein the electric power charged to the plurality of storage batteries is not discharged to a power system but rather is discharged to a load connected to the charge and discharge path.

* * * * *